United States Patent [19]
Yamrom

[11] Patent Number: 5,592,598
[45] Date of Patent: Jan. 7, 1997

[54] METHOD OF COLOR CODING ORIENTATION INFORMATION

[75] Inventor: Boris Yamrom, Schenectady, N.Y.

[73] Assignee: General Electric Company, Schenectady, N.Y.

[21] Appl. No.: 324,996

[22] Filed: Oct. 18, 1994

[51] Int. Cl.⁶ .......................... G06T 15/50; G06T 15/60; G06T 11/40
[52] U.S. Cl. .......................... 395/123; 395/126; 395/131; 395/132
[58] Field of Search .................................. 395/131, 132, 395/120, 124, 127, 126, 123; 382/107, 108, 109

[56] References Cited

U.S. PATENT DOCUMENTS 5,283,858   2/1994   Moellering et al. .................... 395/126

OTHER PUBLICATIONS

Schroeder et al., "The Stream Polygon: A Technique for 3D Vector Field Visualization", *IEEE Visualization Conference*, 1991, pp. 126–132.
Rao et al., "Computerized Flow Field Analysis: Oriented Texture Fields", *IEEE Transaction on Pattern Analysis and Machine Interlligence*, vol. 14, No. 7, Jul. 1992, pp. 693–709.
Foley et al., *Computer Graphics: Principles and Practice*, Addison–Wesley Publishing Company, Inc., 1990, pp. 584–591.
"A Review of Automated Orientation Imaging Microscopy (OIM)" by Stuart I. Wright, Journal of Computer–Assisted Microscopy, vol. 5, No. 3, 1993, pp. 207–221.
"Preferred Orientation in Deformed Metals and Rocks: An Introduction to Modern Texture Analysis" by Hans–Rudolf Wenk, ed., Academic Press, 1985, p.11.
"Orientation Mapping" by F. C. Frank, Met. Trans., 19A, (1988), 403.
"Review, Microtexture Determination by Electron Back-Scatter Diffraction" by D. J. Dingley, V. Randle, Journal of Material Sci. 27, 1992, pp. 4545–4566.
"Visualizing Polycrystalline Orientation Microstructure With Spherical Color Maps" by B. Yamrom, J. A. Sutliff and A. P. Woodfield, General Electric Research & Development Center Paper, Apr. 1994, pp. 1–11.
"Visualizing Polycrystalline Orientaitron Microstructure With Spherical Color Maps", by B. Yamorom, J. A. Sutliff and A. P. Woodfield, Overhead Slides to be used in connection with a presentation at Visualization '94, Sheraton Premier at Tysons Corner, Vienna, VA, Oct. 1994.
"Visualizing Polycrystalline Orientation Microstructure with Spherical Color Maps" by B. Yamrom, J. A. Sutliff anf A. P. Woodfield, Overhead paper to be presented at Visualization '94, Sheraton Premier at Tysons Corner, Vienna, VA., Oct. 1994.
"Application of a New Lattice Orientation Measurement Technique to Polycrystalline Alluminum" by S. I. Wright, B. L. Adams, K. Kunze, Materials Science and Eng., A160, pp. 229–240 (1993).

*Primary Examiner*—Mark K. Zimmerman
*Assistant Examiner*—Stephen Hong
*Attorney, Agent, or Firm*—Lawrence P. Zale; Marvin Snyder

[57] ABSTRACT

The present invention is a method for visualizing a two dimensional field of orientation data on a surface which may be (flat or curved). A unit polyhedron is constructed which approximates a unit sphere centered at a point on the surface corresponding to the orientation vector. Colors are assigned to facets of the polyhedron such that adjacent facets have similar colors. Orientation vectors are projected onto facets of the polyhedron, and the surface point which is associated with the orientation vector is color coded with the color of the intersected facet. The method can be used in geology, metallurgy, stereology, and any other domain where a large set of orientation data is collected.

5 Claims, 4 Drawing Sheets

METHOD OF COLOR CODING ORIENTATION INFORMATION

BACKGROUND OF THE INVENTION

1. Field of the Invention

This invention relates to a method of displaying a field of unit vectors.

2. Description of Related Art

Determination and interpretation of a spatially dispersed field of unit vectors is desirable in many disciplines. This vector field may represent an the direction of instantaneous fluid velocity in a plane intersecting a volume of flowing fluids. It may also represent stress and strain force directions in a solid, or current flow direction through a conductor. One specific important use crystals in materials science and geology. Microscopy, x-ray diffraction, and other techniques are used to obtain the orientation of each crystal structure to create a vector field. Electron backscattering diffraction patterns (EBSP) has also been used to obtain lattice orientation as described in "A Review of Automated Orientation Imaging Microscopy (OIM)" by Stuart I. Wright, *Journal of Computer-Assisted Microscopy*, Vol. 5, No. 3, 1993 ("Wright Review"). The techniques can produce large (several thousands) arrays of orientation data.

The lattice orientation is important in metallurgy in determining where several crystals, or grains share the same orientation. If there are large crystals sharing the same orientation, it may become prone to fracture between crystalline lattice layers.

In other areas, growth of a single crystal is important, and therefore the need to determine the crystal orientations is desirable.

Once the unit vector fields are acquired, they are displayed. The most common method of processing and visualizing this data in materials sciences is pole figures and inverse pole figures "Preferred Orientation in Deformed Metals and Tocks: An Introduction to Modern texture Analysis" by Hans-Rudolf Wenk, ed., Academic Press, 1985, p. 11 ("Wenk publication"). In this method, a single axis of the crystal is mapped to a unit sphere, with a mark being made on the unit sphere where the ray intersects the unit sphere. The unit sphere is projected onto a disk using stereographic or equal area projections. This way the orientations associated with orientation in the sample are represented by point in the disk. This type of display can be very difficult to interpret, since it is not clear which point on the surface corresponds to which intersection of the unit sphere.

Other methods of display were created in recent years that try to address the growth of data volume as described in "Orientation Mapping" by F. C. Frank, *Met. Trans.*, 19A, (1988), 403; and "Review, Microtexture Determination By Electron Back-Scatter Diffraction" by D. J. Dingley, V. Randle, *Journal of Material Sci.* 27 1992, 4545–4566. A disadvantage of Frank's method is that it maps orientation to three dimensional space thus requiring stereograms to view the map. Frank's method utilizing special cubic symmetry of particular lattice structure reduces the total spherical space to 1/48 of its original size.

In the Wright Review ibid., there has also been attempts to employ color mapping to display different orientations but, the color mapping did not ensure that crystals of similar orientation are assigned similar colors.

Currently there is a need for a method of vector field display which allows fast and easy interpretation.

OBJECTS OF THE INVENTION

Accordingly, an object of the present invention is to provide a method which allows for immediate human perception of aggregates of data of equal or close orientation values as well for perception of variations in orientation data spread over prolonged two dimensional areas.

Another object of the present invention is to provide a method of displaying orientation information in a simple and accurate means.

SUMMARY OF THE INVENTION

A display system according to the present invention displays orientation vector fields of a surface (flat or curved), in a manner which allows easy recognition of relative changes of the field.

A number N defining how many solid angle ranges will be employed is first selected. A polyhedron approximating a unit sphere having 2N facets is constructed. N colors are selected and assigned to the facets such that opposite facets have the same color, and a total aggregate of color differences between adjacent facets is minimized. A point on the surface is selected and the orientation vector associated with this surface point are translated such that the surface point is at the center of the polyhedron. The orientation vector is then projected through a facet of the polyhedron. The surface point is then assigned the color of the intersected facet. Other surface points are then color coded as the first surface point to result in a color coded surface.

The present invention can be implemented in software or in hardware, as a part of modern vector field visualization, such as for crystalline analysis methods.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF THE INVENTION

Figure 1:
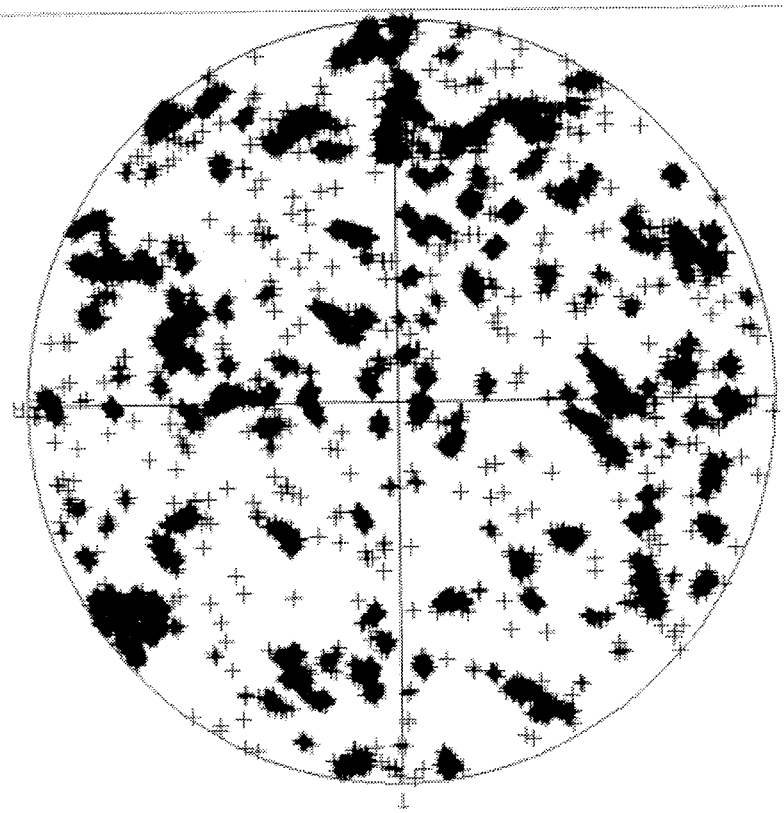
FIG. 1 is a pole diagram of orientation vectors according to a prior art method.

A pole figure as described in the Wenk publication above, is shown in FIG. 1. Even though the intersection of a crystal axis with a unit sphere is displayed, it is difficult to determine which surface point is associated with the orientation vector.

Commonly the orientation of a crystal relative to the sample space is defined by three numbers (phi1, theta, phi2) equal to three consecutive rotations of crystal coordinate system to align it with the sample coordinate system. Phi1 is the angle between 0 and 2*pi of rotation about z axis, theta is the angle between 0 and pi of rotation about x axis, and phi2 is the angle between 0 and 2*pi of rotation about z axis. In many applications the last rotation about z axis is irrelevant. This therefore reduces the crystal orientation problem to that of displaying two orientation angles. The direction of crystals z axis that can be defined by a point on a unit sphere centered at the origin of the crystars coordinate system.

Also, oppositely oriented orientation vectors in crystals with central symmetry, have the same physical significance, therefore θ=θ+π on the unit sphere.

In addition, it is not necessary to uniquely define each vector on the display, but merely categorize related groups or ranges of orientations. Several small solid angle ranges may be used for display purposes, in which all orientations fall within one of the ranges. The smaller the number of ranges which are defined, the smaller the processing requirements, but the larger the display error; and conversely the greater the number of ranges, the larger the processing requirement, but the more accurate the display.

It would also be effective to provide color coding such that an entire surface may be examined at time. It is also desirable that the colors be chosen such that similar orientation angles, have similar colors.

This may be summarized by:

a) close points have similar colors;

b) opposite points have the same color; and c) different points have different colors.

Since in practice to distinguish adjacent orientation areas visually orientation space is quantified, the color space should be quantified also.

The present invention employs a color map which is a faceted polyhedral surface having facets arranged such that locations on the surface are assigned the color of the facet of the unit sphere which the associated vector rays intersects. The facets have colors selected such that nearby facets have similar colors and that facets opposite each other have the same color. By appropriate choice of primary color components we create color map that satisfies all three conditions from previous section.

Figure 2:
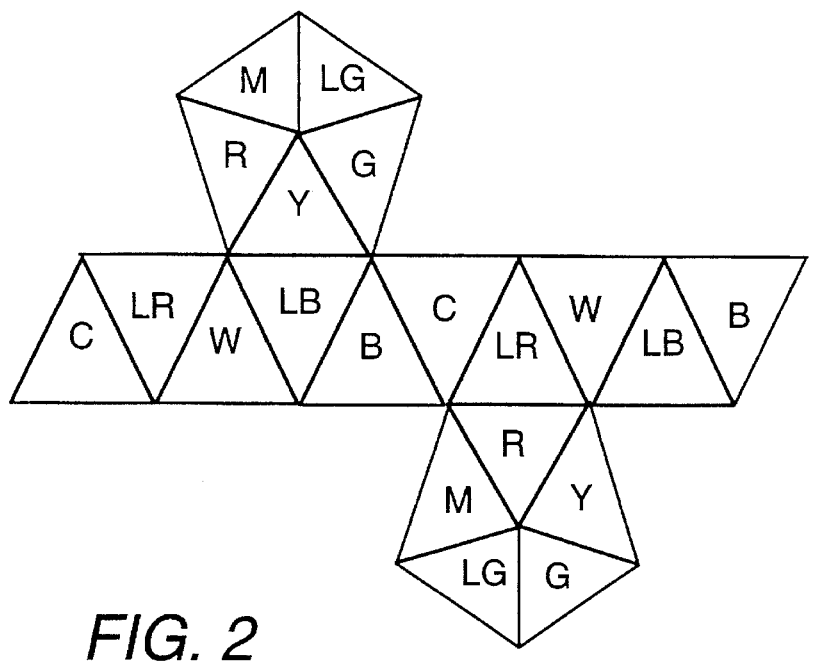
FIG. 2 is an unfolded polyhedron compatible with the present invention used as a color map.

An example is given below. A finite number of orientation ranges are determined. 10 ranges were selected. A polyhedron approximating a unit sphere was selected with twice the number of ranges, in this case, 20, since opposite facets, those intersecting an axis through the origin of the polyhedron, are assigned the same color. The unfolded polyhedron is shown in FIG. 2.

Figure 3:
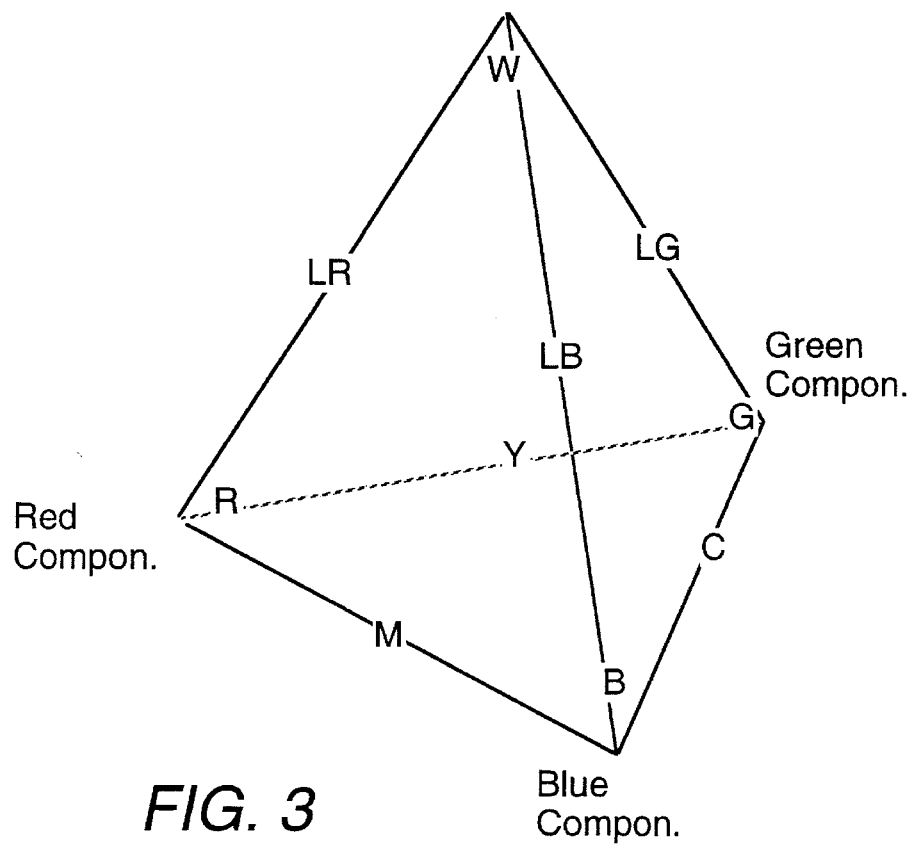
FIG. 3 is a color pallet used in selecting colors to be assigned to the polyhedron of the present invention.

Approximately equally spaced colors were then selected from an red/green/blue (RGB) color pallet shown in FIG. 3. The colors selected, indicated in Table 1, are combinations of RGB intensities.

TABLE 1

| Name | Red Component | Green Component | Blue Component |
| --- | --- | --- | --- |
| Red (R) | 1.0 | 0.3 | 0.3 |
| Green (G) | 0.3 | 1.0 | 0.3 |
| Blue (B) | 0.3 | 0.3 | 1.0 |
| Yellow (Y) | 1.0 | 1.0 | 0.3 |
| Magenta (M) | 1.0 | 0.3 | 1.0 |
| Cyan (C) | 0.3 | 1.0 | 1.0 |

TABLE 1-continued

| Name | Red Component | Green Component | Blue Component |
| --- | --- | --- | --- |
| Light Red (LR) | 1.0 | 0.7 | 0.7 |
| Light Green (LG) | 0.7 | 1.0 | 0.7 |
| Light Blue (LB) | 0.7 | 0.7 | 1.0 |
| White (W) | 1.0 | 1.0 | 1.0 |

The intensities of Table 1 were chosen as an example, but others choices may be made which are preferably equally spaced over the color pallet. These colors may be modified to adjust to a specific color terminal or printing device.

The selected colors are assigned to the facets of the polyhedron. The color assignment is made such that adjacent facets have colors which are near each other on the color pallet. This may also be stated as minimizing the color change from facet to facet for the entire polyhedron. (Only facets of a single hemisphere of the polyhedron, 10 facets here, are assigned colors since opposite facets have the same color.)

Since the colors may be quantified as shown in Table 1, it is possible to use vector subtraction to determine the distance between two different colors. For example, the distance from yellow to cyan could be calculated as:

$$dist=sqrt\{(\text{red intensity of yellow} - \text{red intensity of cyan})^2 + (\text{green intensity of yellow} - \text{green intensity of cyan})^2 + (\text{blue intensity of yellow} - \text{blue intensity of cyan})^2\};$$

or $$dist=sqrt\{(1.0-0.3)^2+(1.0-1.0)^2+(0.3-1.0)^2\},$$

where "sqrt" is the square root function.

Other methods of distance measurement may be employed, and the above example was presented for illustrative purposes.

Since distances between colors may be determined, iterative methods of assigning colors to facets may be employed to result in a color map which minimizes overall distance between adjacent colors.

Conventional color definition according to hue, saturation, and value is an alternative method of quantification of colors which may be used instead of RGB quantification. Hues according to a standard color wheel are spanned twice in one full turn around the polyhedron. This results in the same hue given to all facets on a meridian. Saturation of colors on facets are then adjusted according to their latitude, with those closer to the north pole getting closer to white, and those closer to the equator being more saturated. Value is then specified according to facet latitude with latitudes from 0° to −180° being set to a number which is different from those of latitude from 0° to 180°.

Figure 4B:
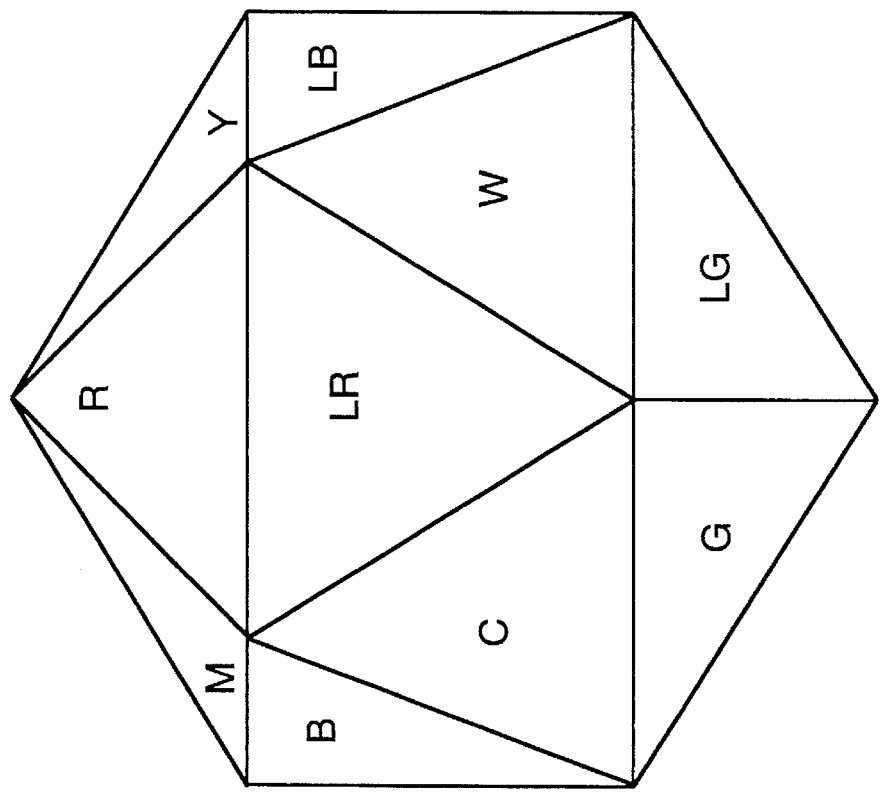
FIGS. 4a, and 4b illustrate the 20 sided polyhedron of FIG. 1 as it would appear if not unfolded.
Figure 4A:
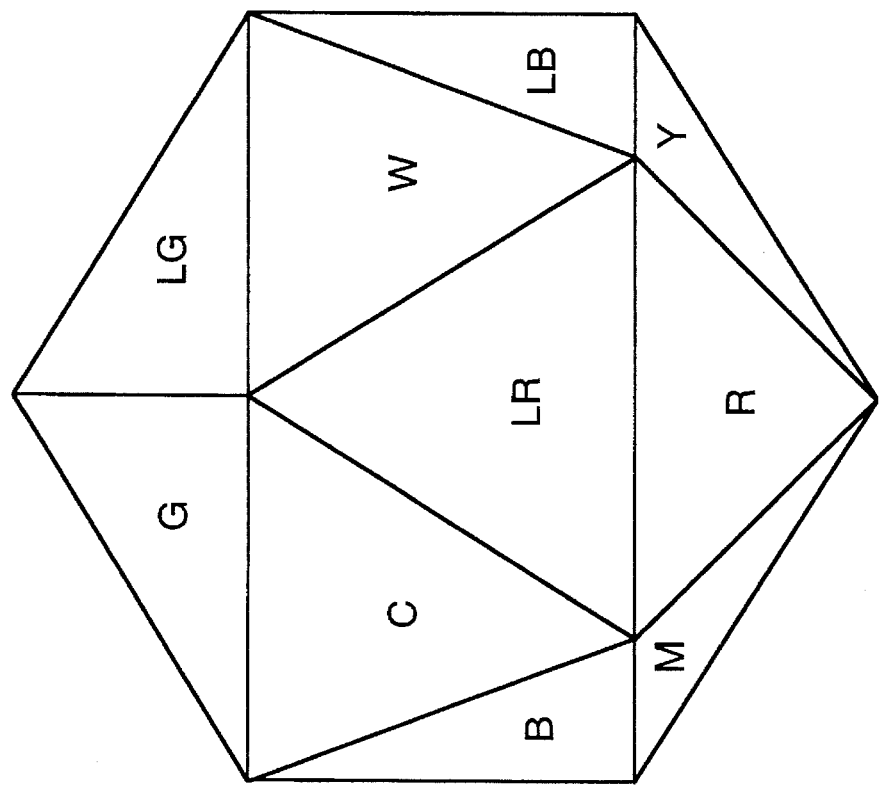

FIGS. 4a, and 4b shows a black and white image of front and back view, respectively of the polyhedron of FIG. 2.

Figure 5:
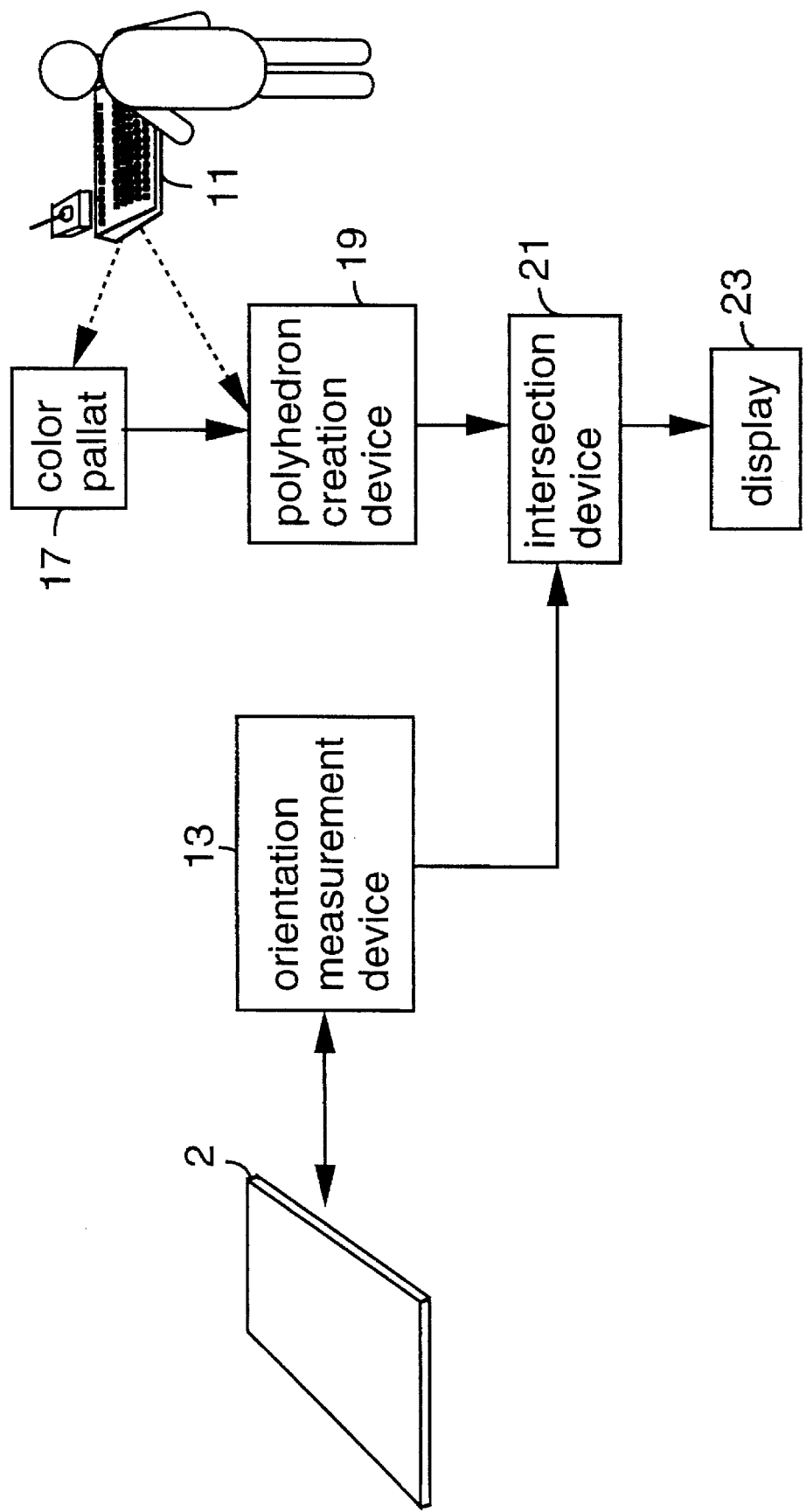
FIG. 5 is a simplified block diagram of an apparatus of the present invention.

The present invention may be implemented as shown in FIG. 5. A sample 2 from which orientation information, a field of orientation vectors, is acquired is analyzed by an orientation measurement device 13. The orientation vector field is provided to an intersection device 21.

An operator defines the number of solid angle ranges, and optionally selects colors from a pallet 17 through an input device 11. Polyhedron creation device 19 defines a polyhedron matching the inputs, and assigns colors to facets of the polyhedron. These are chosen as described above such that there are no abrupt color changes between adjacent facets.

The polyhedron and assigned colors are provided to intersection device 21. Intersection device 21 then translates each orientation vector such that its origin in the center of the polyhedron. The orientation vector is extended to determine the facet it intersects. Intersection device 21 then assigns the color of the intersected facet to the surface point. This process is repeated until all sample points have been color coded.

Figure 6:
FIG. 6 is a gray scale representation of the color coded surface map produced by the present invention.

The method is implemented in a LYMB programming environment (developed at the General Electric Research and Development Center, Schenectady, N.Y.). The method of the present invention was applied to an EBSP data set containing 30,000 measurements of crystal orientation in a sample of titanium alloy to result in an image color-coded according to the measured orientation. The colors were assigned according to Table 1 and FIG. 2. FIG. 6 is a black and white copy of the color image produced by the present invention. Each point of the surface is represented by a small colored square positioned according to its position in the sample and The step size along both axis is 20.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of color coding points on a surface having associated orientation vectors comprising the steps of:
    a) employing an input device to select a number N defining how many solid angle ranges will be employed;
    b) employing the polyhedron creation device to receive the number N from the input device and define a polyhedron having 2N facets, an equator and top and bottom poles;
    c) utilizing an input device to interact with an operator to select N colors;
    d) employing the polyhedron creation device to assign the N colors to the facets such that opposite facets have the same color, and a total aggregate of color differences between adjacent facets is minimized;
    e) selecting a surface point;
    f) utilizing an intersection device to determine which facet will be intersected by the orientation vector associated with the selected surface point when the polyhedron is deemed to be centered over the selected surface point;
    g) color coding the selected surface point with the intersection device with the color assigned to the intersected facet; and
    h) repeating steps "f"–"g" for remaining points on said surface to result in a color coded surface.

2. The method of color coding points on a surface of claim 1 wherein the step of assigning N colors to the facets comprises the steps of:
    a) employing a polyhedron creation device to set a hue to each facet of the polyhedron such that the hue spans a color spectrum twice for one full turn around the polyhedron;
    b) employing a polyhedron creation device to set a saturation of each facet of the polyhedron based upon its position between the top and bottom poles of the polyhedron; and
    c) employing a polyhedron creation device to set a value of each facet of the polyhedron with longitude of 0° to 180° to a number different from that of facets having longitude of 0° to −180°.

3. The method of color coding points on a surface of claim 1 wherein the step of assigning N colors to the facets comprises the steps of:
    a) setting a color to each facet to result in a color assignment set;
    b) determining an aggregate distance being the sum of the distances between colors of adjacent facets for this color assignment set;
    c) storing the aggregate distance for this combination;
    d) repeating steps "a"–"c" for a plurality of color assignment sets; and
    e) assigning colors to facets according to the color assignment set having the lowest aggregate distance.

4. The method of color coding points on a surface of claim 3 wherein the distances between colors is determined by:

$$\text{dist}=\text{sqrt}\{(\text{red component of first color}-\text{red component of second color})^2+(\text{green component of first color}-\text{green component of second color})^2+(\text{blue component of first color}-\text{blue component of second color})^2\},$$

where "sqrt" is the square root function.

5. An apparatus for graphically illustrating crystal orientation comprising:
    a) an input device to interact with an operator to define a number N representing the number of colors to be employed, and N colors;
    b) a polyhedron creation device for creating a polyhedron having 2N facets, and for assigning each of the colors to the facets;
    c) an intersection device for receiving crystal orientation information of a plurality of crystals for which a graphic is desired, and for creating rays oriented in the same manner as the corresponding crystals, for determining which facet of the polyhedron each crystal will intersect if placed at the center of the polyhedron, and for assigning the color assigned to the facet which the ray intersects for the corresponding crystal;
    d) display means for providing a graphical display of the colors assigned to each crystal at the location of the corresponding crystal.

* * * * *

UNITED STATES PATENT AND TRADEMARK OFFICE
CERTIFICATE OF CORRECTION

PATENT NO. : 5,592,598

DATED : January 7, 1997

INVENTOR(S) : Boris (nmn) Yamrom

It is certified that error appears in the above-identified patent and that said Letters Patent is hereby corrected as shown below:

Claim 1, line 31, change "the" to -- a --.

Claim 1, line 35, change "an" to -- the --.

Claim 2, lines 1, 5 and 9 - change "a polyhedron" to -- the polyhedron --.

Signed and Sealed this

Twenty-second Day of April, 1997

*Attest:*

BRUCE LEHMAN

*Commissioner of Patents and Trademarks*

*Attesting Officer*